US012725234B2

(12) United States Patent
Hara

(10) Patent No.: US 12,725,234 B2
(45) Date of Patent: Sep. 1, 2026

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Takayuki Hara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 18/743,723

(22) Filed: Jun. 14, 2024

(65) Prior Publication Data

US 2025/0005724 A1 Jan. 2, 2025

(30) Foreign Application Priority Data

Jun. 28, 2023 (JP) ................................ 2023-106204

(51) Int. Cl.
*G06T 5/00* (2024.01)
*G06T 5/80* (2024.01)
*G06T 11/00* (2006.01)

(52) U.S. Cl.
CPC ................ *G06T 5/80* (2024.01); *G06T 11/00* (2013.01)

(58) Field of Classification Search
CPC ... G06T 5/80; G06T 11/00; G06T 3/00; G06T 1/60
See application file for complete search history.

(56) References Cited

U.S. PATENT DOCUMENTS

2011/0128589 A1* 6/2011 Hasegawa .......... G06K 15/1843 358/451

FOREIGN PATENT DOCUMENTS

JP 2008118306 A * 5/2008 ............ G06T 3/047
JP 4781229 B2 9/2011
JP 2013125401 A 6/2013

OTHER PUBLICATIONS

Ramapriyan, Data Handling for the Geometric Correction of Large Images, IEEE Transactions on Computers, vol. C-26, No. 11, pp. 1163-1167 (Year: 1977).*

* cited by examiner

*Primary Examiner* — Xiao Liu
(74) *Attorney, Agent, or Firm* — Cowan, Liebowitz & Latman, P.C.

(57) ABSTRACT

A first temporary storage unit has a first storage capacity that is smaller than a data amount of a second image generated by executing signal processing with respect to a first image. A second temporary storage unit has a second storage capacity that is equal to or larger than the data amount of the second image. A selection unit selects the first temporary storage unit as a temporary storage unit that temporarily stores the second image in a case where a rotation angle of the second image in geometric transformation processing does not exceed a predetermined angle that is based on the first storage capacity and on the data amount of the second image. The selection unit selects the second temporary storage unit as the temporary storage unit in a case where the rotation angle exceeds the predetermined angle.

10 Claims, 8 Drawing Sheets

FIG. 1A

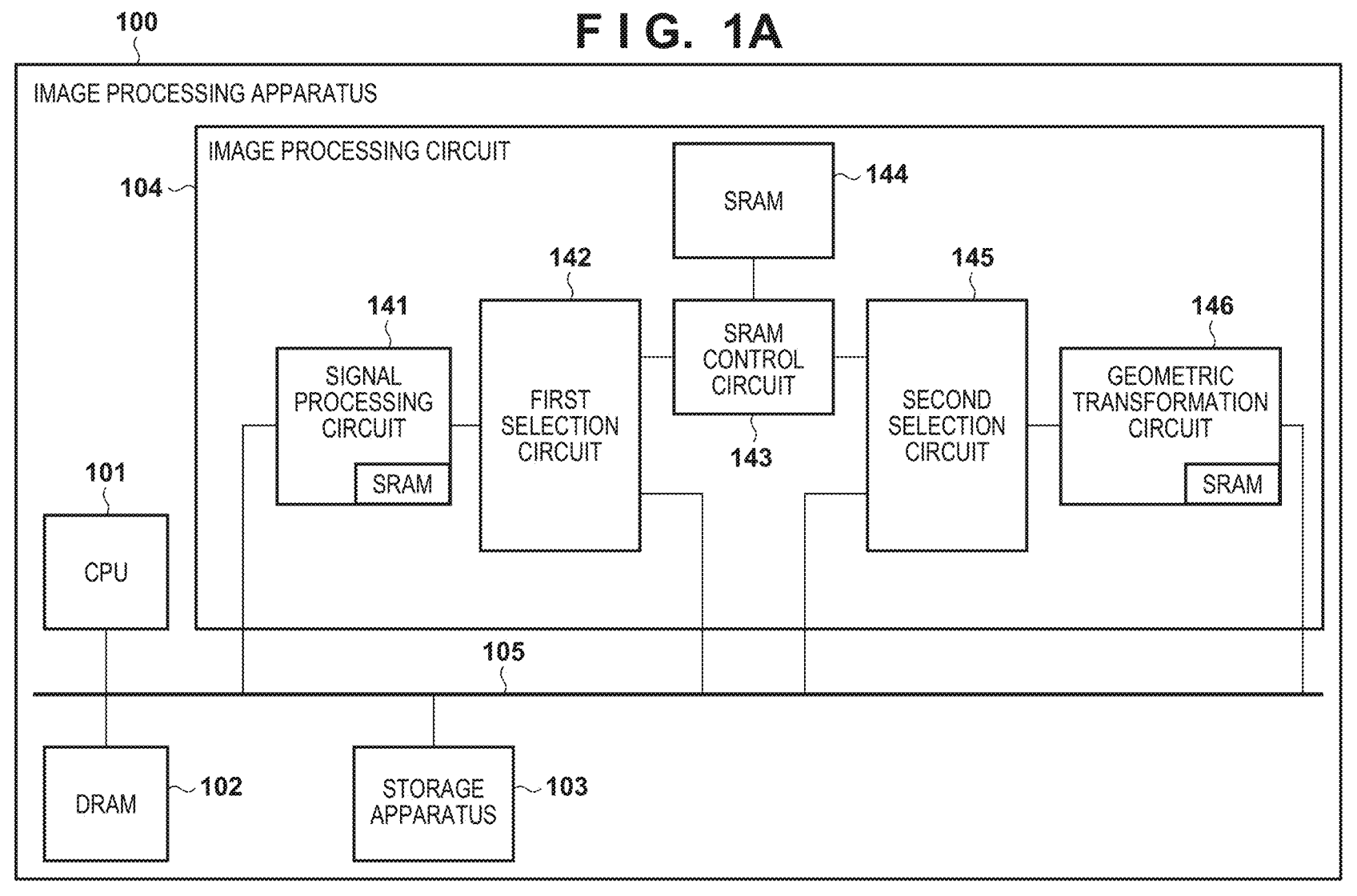

100 IMAGE PROCESSING APPARATUS
104 IMAGE PROCESSING CIRCUIT
141 SIGNAL PROCESSING CIRCUIT
SRAM
142 FIRST SELECTION CIRCUIT
143 SRAM CONTROL CIRCUIT
144 SRAM
145 SECOND SELECTION CIRCUIT
146 GEOMETRIC TRANSFORMATION CIRCUIT
SRAM
105
101 CPU
102 DRAM
103 STORAGE APPARATUS

INPUT IMAGE
151
SIGNAL PROCESSING UNIT
152
FIRST SELECTION UNIT
153
FIRST TEMPORARY STORAGE UNIT
154
SECOND TEMPORARY STORAGE UNIT
155
SECOND SELECTION UNIT
156
GEOMETRIC TRANSFORMATION UNIT
OUTPUT IMAGE

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Digital cameras are known that execute geometric transformation processing for images for the purpose of distortion correction, electronic anti-vibration, rolling shutter distortion correction, and the like. A technique that includes the implementation of random access to a large-capacity memory (e.g., a DRAM) is known as a technique of the geometric transformation processing. Japanese Patent No. 4781229 discloses a technique to improve the efficiency of access to a large-capacity memory in geometric transformation processing.

Meanwhile, in recent years, the number of pixels in an image sensor is increasing, and recording of high-resolution moving images is becoming a norm. Also, there are cases where a large number of accesses are made to a DRAM in processing other than geometric transformation processing. This gives rise to the possibility that the access bandwidth for the DRAM becomes congested. Japanese Patent Laid-Open No. 2013-125401 discloses a technique to reduce accesses to a DRAM by installing a high-speed memory (e.g., an SRAM) dedicated for geometric transformation processing on an image capturing apparatus.

Even in a case where an image capturing apparatus includes a plurality of memories (e.g., an SRAM and a DRAM), not all memories necessarily have a capacity that can store the entirety of a processing target image. For example, as an SRAM is more expensive than a DRAM, it is possible that the capacity of an SRAM installed on an image capturing apparatus is reduced for cost reduction. When a memory cannot hold the entirety of the processing target image, there is a case where geometric transformation processing cannot be executed appropriately depending on the contents of the geometric transformation processing.

SUMMARY OF THE INVENTION

The present invention has been made in view of the foregoing situation. The present invention provides a technique where a memory with a storage capacity smaller than the data amount of a target image for geometric transformation processing, and a memory with a storage capacity equal to or larger than the data amount of the target image, can be selectively used as needed as a memory that temporarily stores the target image.

According to a first aspect of the present invention, there is provided an image processing apparatus, comprising at least one memory and at least one processor and/or at least one circuit which function as: a signal processing unit configured to generate a second image by executing signal processing with respect to a first image; a first temporary storage unit configured to have a first storage capacity that is smaller than a data amount of the second image; a second temporary storage unit configured to have a second storage capacity that is equal to or larger than the data amount of the second image; a selection unit configured to select the first temporary storage unit or the second temporary storage unit as a temporary storage unit that temporarily stores the second image, the signal processing unit outputting the second image to the temporary storage unit on a per-line basis in sequence; and a geometric transformation unit configured to generate a third image on a per-line basis in sequence by executing geometric transformation processing that is based on the second image stored in the temporary storage unit, wherein the selection unit selects the first temporary storage unit as the temporary storage unit in a case where a rotation angle of the second image in the geometric transformation processing does not exceed a predetermined angle that is based on the first storage capacity and on the data amount of the second image, and selects the second temporary storage unit as the temporary storage unit in a case where the rotation angle exceeds the predetermined angle, and in a case where the first temporary storage unit has been selected as the temporary storage unit, the first temporary storage unit stores the second image output from the signal processing unit on a per-line basis in sequence, and sequentially discards parts of the second image that are finished being used in accordance with a progress of the geometric transformation processing, so that the first storage capacity does not overflow.

According to a second aspect of the present invention, there is provided an image capturing apparatus, comprising: the image processing apparatus according to the first aspect, and an image sensor configured to generate the first image.

According to a third aspect of the present invention, there is provided an image processing method executed by an image processing apparatus comprising a signal processing unit, a first temporary storage unit, a second temporary storage unit, a selection unit, and a geometric transformation unit, the method comprising: generating, by the signal processing unit, a second image by executing signal processing with respect to a first image; selecting, by the selection unit, the first temporary storage unit or the second temporary storage unit as a temporary storage unit that temporarily stores the second image, wherein the first temporary storage unit has a first storage capacity that is smaller than a data amount of the second image, the second temporary storage unit has a second storage capacity that is equal to or larger than the data amount of the second image, and the signal processing unit outputs, in the generating, the second image to the temporary storage unit on a per-line basis in sequence; and generating, by the geometric transformation unit, a third image on a per-line basis in sequence by executing geometric transformation processing that is based on the second image stored in the temporary storage unit, wherein in the selecting: the first temporary storage unit is selected as the temporary storage unit in a case where a rotation angle of the second image in the geometric transformation processing does not exceed a predetermined angle that is based on the first storage capacity and on the data amount of the second image, and the second temporary storage unit is selected as the temporary storage unit in a case where the rotation angle exceeds the predetermined angle, and wherein the method further comprises, in a case where the first temporary storage unit has been selected as the temporary storage unit, storing, by the first temporary storage unit, the second image output from the signal processing unit on a per-line basis in sequence, and sequentially discard, by the first temporary storage unit, parts of the second image that are finished being used in accordance with a progress of the geometric transformation processing, so that the first storage capacity does not overflow.

According to a fourth aspect of the present invention, there is provided a non-transitory computer-readable storage medium which stores a program for causing an image processing apparatus, which comprises a signal processing unit, a first temporary storage unit, a second temporary storage unit, a selection unit, and a geometric transformation unit, to execute an image processing method comprising: generating, by the signal processing unit, a second image by executing signal processing with respect to a first image; selecting, by the selection unit, the first temporary storage unit or the second temporary storage unit as a temporary storage unit that temporarily stores the second image, wherein the first temporary storage unit has a first storage capacity that is smaller than a data amount of the second image, the second temporary storage unit has a second storage capacity that is equal to or larger than the data amount of the second image, and the signal processing unit outputs, in the generating, the second image to the temporary storage unit on a per-line basis in sequence; and generating, by the geometric transformation unit, a third image on a per-line basis in sequence by executing geometric transformation processing that is based on the second image stored in the temporary storage unit, wherein in the selecting: the first temporary storage unit is selected as the temporary storage unit in a case where a rotation angle of the second image in the geometric transformation processing does not exceed a predetermined angle that is based on the first storage capacity and on the data amount of the second image, and the second temporary storage unit is selected as the temporary storage unit in a case where the rotation angle exceeds the predetermined angle, and wherein the method further comprises, in a case where the first temporary storage unit has been selected as the temporary storage unit, storing, by the first temporary storage unit, the second image output from the signal processing unit on a per-line basis in sequence, and sequentially discard, by the first temporary storage unit, parts of the second image that are finished being used in accordance with a progress of the geometric transformation processing, so that the first storage capacity does not overflow.

Further features of the present invention will become apparent from the following description of exemplary embodiments with reference to the attached drawings.

BRIEF DESCRIPTION OF THE DRAWINGS

FIG. 1A is a block diagram showing a hardware configuration of an image processing apparatus 100.

DESCRIPTION OF THE EMBODIMENTS

Figure 1B:
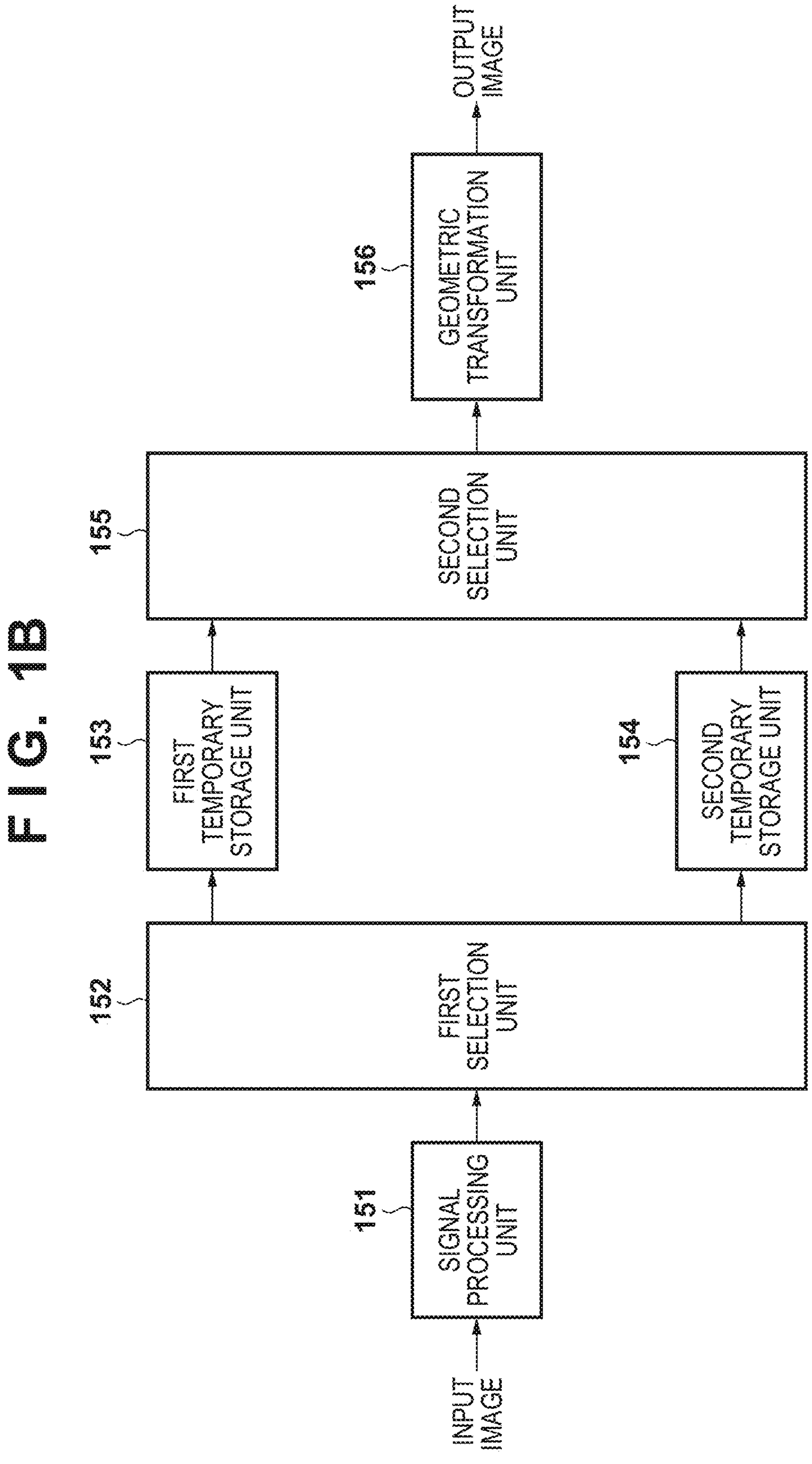
FIG. 1B is a block diagram showing a functional configuration of the image processing apparatus 100 according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hardware Configuration of Image Processing Apparatus 100

FIG. 1A is a block diagram showing a hardware configuration of an image processing apparatus 100. The image processing apparatus 100 is configured to execute geometric transformation processing with respect to an image. The image targeted for the geometric transformation processing is, for example, an image shot by an image capturing apparatus such as a digital camera.

In the image processing apparatus 100, a CPU 101, a DRAM 102, a storage apparatus 103, and an image processing circuit 104 are mutually connected via a bus 105. The CPU 101 controls the entirety of the image processing apparatus 100 by executing a program stored in the storage apparatus 103. The DRAM 102 is used as a working memory when the CPU 101 executes the program. Also, the DRAM 102 is used to temporarily store various types of data, including a processing target image for the image processing circuit 104. The storage apparatus 103 stores the program executed by the CPU 101, images processed by the image processing circuit 104, and the like.

The image processing circuit 104 includes a signal processing circuit 141, a first selection circuit 142, an SRAM control circuit 143, an SRAM 144, a second selection circuit 145, and a geometric transformation circuit 146. The operations of the image processing circuit 104 will be described later with reference to FIG. 1B.

Note that the image processing apparatus 100 may include an image sensor (not shown). In this case, the image processing apparatus 100 can additionally have the functions of an image capturing apparatus that shoots a processing target image.

Functional Configuration of Image Processing Apparatus 100

FIG. 1B is a block diagram showing a functional configuration of the image processing apparatus 100. The functions of a signal processing unit 151 are realized by the signal processing circuit 141 that operates under control of the CPU 101. The signal processing unit 151 executes signal processing with respect to an input image. The signal processing executed includes, but is not particularly limited to, vignetting correction, transverse chromatic aberration correction, de-Bayer processing, noise reduction processing, gamma correction, sharpness correction, and the like. The input image is input to the signal processing unit 151 on a per-line basis, from top to bottom, in sequence. The input lines are temporarily held in an SRAM inside the signal processing circuit 141. The signal processing unit 151 executes the signal processing sequentially with respect to the lines that are input sequentially, and outputs the processing results (processed lines) sequentially to a first selection unit 152.

The functions of the first selection unit 152 are realized by the first selection circuit 142 that operates under control of the CPU 101. The first selection unit 152 outputs the processing results from the signal processing unit 151 selectively to a first temporary storage unit 153 or a second temporary storage unit 154. The selection criterion used by the first selection unit 152 will be described later.

The functions of the first temporary storage unit 153 are realized by the SRAM control circuit 143 and the SRAM 144 that operate under control of the CPU 101. The first temporary storage unit 153 performs control to temporarily store the processing results from the signal processing unit 151 into the SRAM 144. The SRAM 144 has a capacity that can hold only a part of the processing target image. The capacity of the SRAM 144 is larger than the capacity of an SRAM inside the geometric transformation circuit 146, and is smaller than the capacity of the DRAM 102. In accordance with a read request from a geometric transformation unit 156, the first temporary storage unit 153 holds a part of the processing results from the signal processing unit 151 in the SRAM 144 for a predetermined period, and outputs the same to the geometric transformation unit 156 via a second selection unit 155.

The functions of the second temporary storage unit 154 are realized by the CPU 101 and the DRAM 102. The second temporary storage unit 154 performs control to temporarily store the processing results from the signal processing unit 151 into the DRAM 102. The DRAM 102 has a capacity that can hold the entirety of the processing target image.

Note that the memory of the first temporary storage unit 153 is not limited to the SRAM 144. Any memory can be used as the memory of the first temporary storage unit 153 as long as it is a memory that is independent of the memory of the second temporary storage unit 154 (e.g., the DRAM 102) and has a storage capacity smaller than the data amount of a target image for geometric transformation processing (a second image). Also, the memory of the second temporary storage unit 154 is not limited to the DRAM 102. Any memory can be used as the memory of the second temporary storage unit 154 as long as it is a memory that is independent of the memory of the first temporary storage unit 153 (e.g., the SRAM 144) and has a storage capacity equal to or larger than the data amount of the target image for the geometric transformation processing (the second image). For example, the image processing apparatus 100 may include a DRAM for the second temporary storage unit 154 that is different from the DRAM 102. In this case, the functions of the second temporary storage unit 154 are realized by the CPU 101 and the DRAM different from the DRAM 102.

For example, the memory of the first temporary storage unit 153 may be a dedicated memory (a memory dedicated for the geometric transformation processing executed by the geometric transformation unit 156). The memory of the second temporary storage unit 154 may be a shared memory (a memory that is used not only for the geometric transformation processing executed by the geometric transformation unit 156, but also for other types of processing). Furthermore, the memory of the first temporary storage unit 153 (e.g., the SRAM 144) may be a memory with a speed faster than that of the memory of the second temporary storage unit 154 (e.g., the DRAM 102).

The functions of the second selection unit 155 are realized by the second selection circuit 145 that operates under control of the CPU 101. The second selection unit 155 selects the first temporary storage unit 153 or the second temporary storage unit 154 using the same selection criterion as the first selection unit 152. The second selection unit 155 connects the selected one of the first temporary storage unit 153 and the second temporary storage unit 154 to the geometric transformation unit 156.

The functions of the geometric transformation unit 156 are realized by the geometric transformation circuit 146 that operates under control of the CPU 101. The geometric transformation unit 156 executes the geometric transformation processing with respect to the processing results from the signal processing unit 151 that are input via the second selection unit 155.

Selection Criterion Used by First Selection Unit 152 and Second Selection Unit 155

The first selection unit 152 and the second selection unit 155 select the first temporary storage unit 153 or the second temporary storage unit 154 depending on whether the capacity of the memory of the first temporary storage unit 153 (the SRAM 144) is sufficient to execute the geometric transformation processing. The storage capacity required to execute the geometric transformation processing with respect to a specific image is determined in accordance with a rotation angle of the geometric transformation (an angle by which the image is rotated through the geometric transformation); the larger the rotation angle, the larger the required storage capacity. In view of this, the first selection unit 152 and the second selection unit 155 select the first temporary storage unit 153 in a case where the rotation angle of the geometric transformation does not exceed a predetermined angle, and select the second temporary storage unit 154 in a case where the rotation angle of the geometric transformation exceeds the predetermined angle. A case where the geometric transformation does not involve rotation (e.g., a case where the rotation angle of the geometric transformation is 0) is included in the case where the rotation angle of the geometric transformation does not exceed the predetermined angle.

The predetermined angle used here is determined to satisfy the following condition: the storage capacity required for a case where the rotation angle of the geometric transformation is the predetermined angle does not exceed the memory capacity of the first temporary storage unit 153. As one example, the predetermined angle is determined so that the storage capacity required for the case where the rotation angle of the geometric transformation is the predetermined angle matches the memory capacity of the first temporary storage unit 153. In this case, the first temporary storage unit 153 is selected as long as the geometric transformation processing can be executed. Unlike the memory of the second temporary storage unit 154 (e.g., the DRAM 102), the memory of the first temporary storage unit 153 (e.g., the SRAM 144) has a dedicated access bandwidth; therefore, in a case where the first temporary storage unit 153 has been selected, the geometric transformation unit 156 can execute the geometric transformation processing at high speed. Therefore, adopting the configuration that selects the first temporary storage unit 153 as long as the geometric transformation processing can be executed, has the advantage of increasing the possibility of the execution of high-speed geometric transformation processing.

Figure 1C:
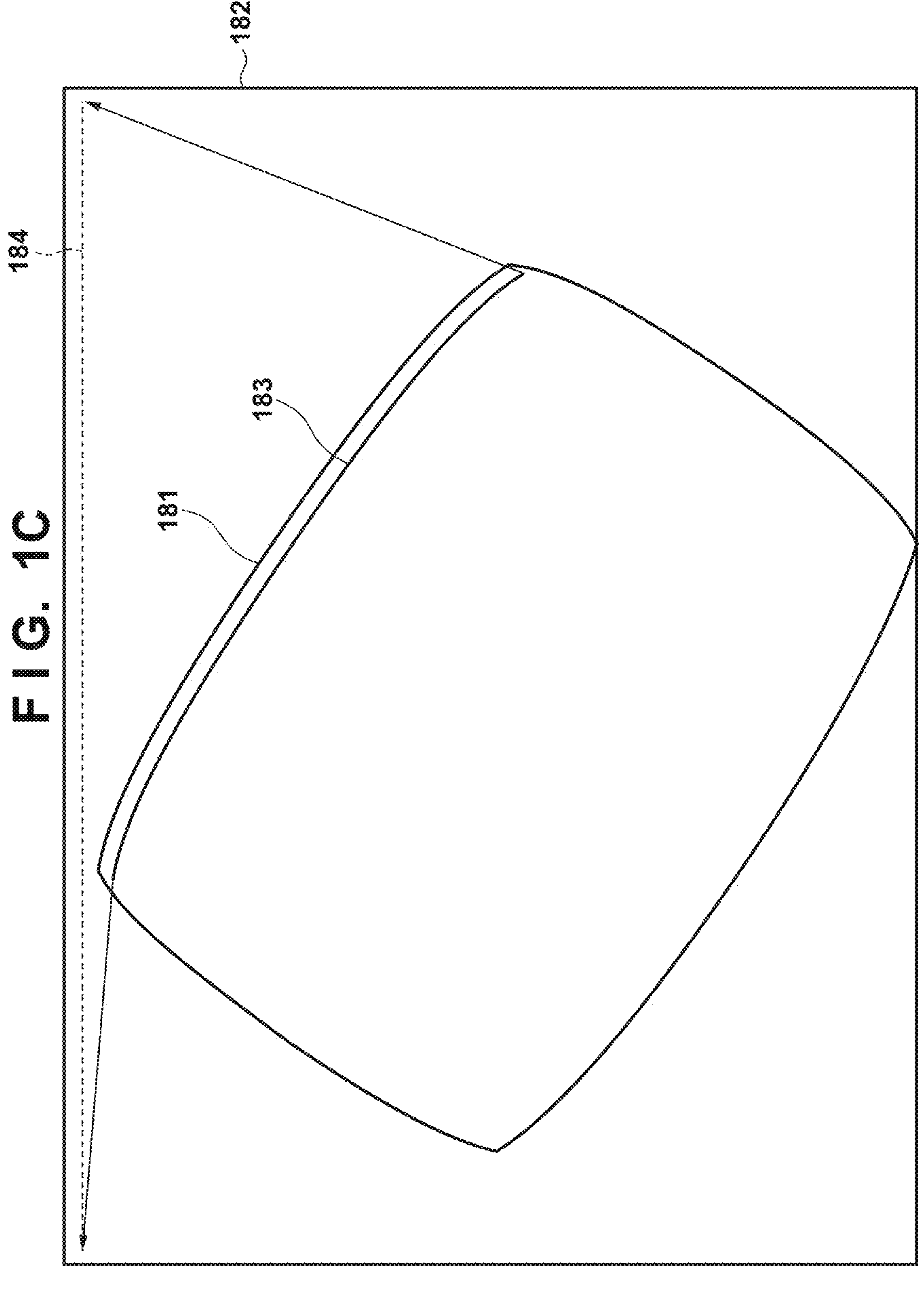
FIG. 1C is a diagram illustrating examples of a storage capacity required to execute geometric transformation processing and a predetermined angle.

Examples of the storage capacity required to execute the geometric transformation processing and the predetermined angle will now be described with reference to FIG. 1C and FIG. 1D. In FIG. 1C, an input image 181 is a target image for the geometric transformation processing, and an output image 182 is an output image from the geometric transformation unit 156 (an image generated as a result of the geometric transformation processing). FIG. 1C depicts a state where the input image 181 is tilted, and the level output image 182 is generated by executing the geometric transformation processing that rotates the input image 181.

The geometric transformation unit 156 generates and outputs the output image 182, which is the result of the geometric transformation processing, on a per-line basis, from the topmost line of the output image 182 to the bottom, in sequence. In order for the geometric transformation unit 156 to output a line 184, the geometric transformation unit 156 needs to use (refer to) a line 183 of the input image 181.

Meanwhile, as stated earlier, the signal processing unit 151 executes the signal processing sequentially with respect to the lines that are input sequentially, and outputs the processing results (processed lines) sequentially to the first selection unit 152. Each line is output only once; thus, in a case where the first selection unit 152 has selected the first temporary storage unit 153, the first temporary storage unit 153 needs to keep holding data of each input line as long as this data has a possibility of being referred to for the geometric transformation.

For example, as shown in FIG. 1C, in order for the geometric transformation unit 156 to output the line 184 of the output image 182, the geometric transformation unit 156 needs to refer to the line 183 of the input image 181. In this case, the geometric transformation unit 156 needs to hold data pieces corresponding to a plurality of partial regions 185 indicated by a plurality of rectangles in FIG. 1D. Here, among the plurality of partial regions 185, partial regions that do not overlap the line 183 are not referred to when outputting the line 184. However, the partial regions 185 that do not overlap the line 183 are also referred to when the geometric transformation unit 156 later outputs lines of the output image 182 that are below the line 184. For this reason, while the line 184 is being processed, the first temporary storage unit 153 needs to keep holding the entirety of data pieces corresponding to the plurality of partial regions 185 shown in FIG. 1D, including the partial regions that do not overlap the line 183.

A range which is in the input image 181 and which corresponds to the plurality of partial regions 185 that should be held by the first temporary storage unit 153 is determined in accordance with the rotation angle of the geometric transformation. Also, the data amount of the input image is determined in accordance with a data format (e.g., the number of pixels and the bit depth) of the input image, and the data amount corresponding to the plurality of partial regions 185, which are determined in accordance with the rotation angle of the geometric transformation, in the input image is determined in accordance with the data amount of the input image. Therefore, the storage capacity required to execute the geometric transformation processing is determined based on the rotation angle and on the data amount of the input image. The predetermined angle can be determined based on the storage capacity determined in the foregoing manner and on the memory capacity of the first temporary storage unit 153, so as to satisfy the condition that the storage capacity required for the case where the rotation angle of the geometric transformation is the predetermined angle does not exceed the memory capacity of the first temporary storage unit 153. Therefore, the predetermined angle is based on the memory capacity of the first temporary storage unit 153 and on the data amount of the input image.

Figure 1D:
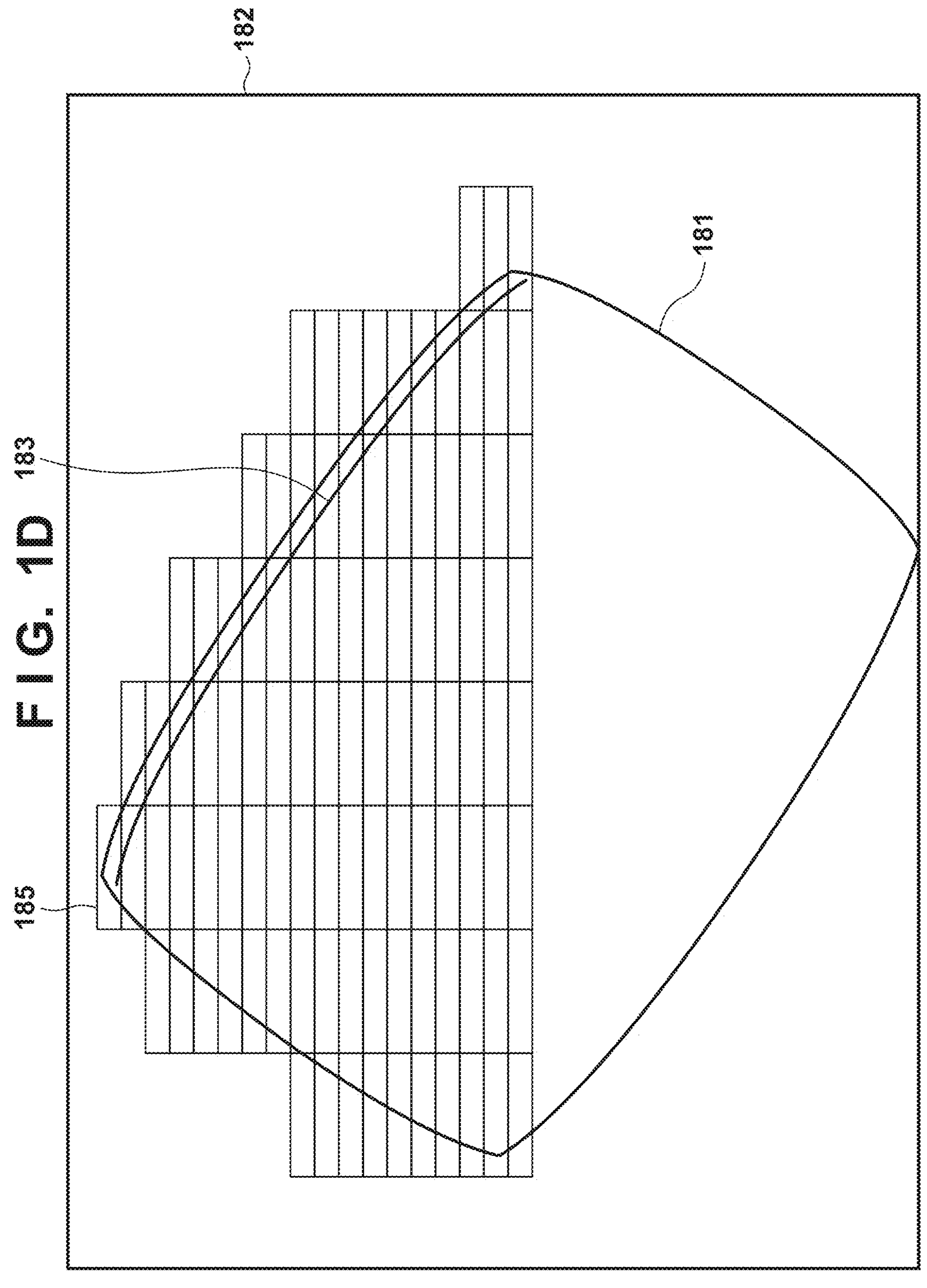
FIG. 1D is a diagram illustrating examples of the storage capacity required to execute the geometric transformation processing and the predetermined angle.

Note that in the example of FIG. 1D, the first temporary storage unit 153 manages data pieces of the partial regions 185 on a per-region basis. By adopting this configuration, processing for holding and discarding data is simplified; accordingly, the structure of the SRAM control circuit 143 can be simplified. However, the present embodiment is not limited to the configuration that manages data pieces of the partial regions 185 on a per-region basis. For example, the first temporary storage unit 153 may manage data in units of pixels of the input image 181.

According to the foregoing description provided with reference to FIG. 1C and FIG. 1D, in a case where the first selection unit 152 has selected the first temporary storage unit 153, it is necessary to keep holding data of each input line as long as this data has a possibility of being referred to for the geometric transformation. The same goes for a case where the first selection unit 152 has selected the second temporary storage unit 154. However, as the memory of the second temporary storage unit 154 has the capacity that can hold the entirety of the processing target image, even in a case where the rotation angle of the geometric transformation is large, the second temporary storage unit 154 can keep holding all of necessary data pieces. Therefore, in the case where the rotation angle exceeds the predetermined angle, the geometric transformation processing can be executed by selecting the second temporary storage unit 154.

Control for Restricting Rotation Angle

As described above, in a case where the rotation angle of the geometric transformation exceeds the predetermined angle, there is a possibility that the memory capacity of the first temporary storage unit 153 becomes insufficient, and thus the first selection unit 152 and the second selection unit 155 select the second temporary storage unit 154. Therefore, to put it another way, restricting the rotation angle so that the rotation angle becomes equal to or smaller than the predetermined angle can suppress the occurrence of the situation where the memory capacity of the first temporary storage unit 153 becomes insufficient, thereby allowing for the selection of the first temporary storage unit 153 that has a memory with a dedicated access bandwidth. As a result, the geometric transformation processing can be executed at high speed, and consumption of a shared access bandwidth of the DRAM 102 by the geometric transformation processing can be suppressed as well.

In view of this, in a case where a predetermined condition is satisfied, the CPU 101 performs control in which the rotation angle of the geometric transformation is restricted so as not to exceed the predetermined angle, and causes the first selection unit 152 and the second selection unit 155 to select the first temporary storage unit 153. A case where the predetermined condition is satisfied is, for example, a case where the geometric transformation processing needs to be executed at high speed, a case where consumption of the access bandwidth of the DRAM 102 needs to be suppressed, or the like.

For example, assume a case where the geometric transformation unit 156 performs the geometric transformation for the purpose of electronic anti-vibration for a shot image. In a case where moving images are shot at a relatively high data rate such as 8K60P (a first data rate), it is necessary to execute the geometric transformation processing at high speed. Also, in this case, as the amount of consumption of the access bandwidth of the DRAM 102 by shooting of the moving images is large, there is a possibility that the access bandwidth of the DRAM 102 becomes congested if the access bandwidth of the DRAM 102 is used for the geometric transformation processing. In view of this, in a case where the moving images are shot in a moving image recording mode at 8K60P (in a case where a target image for the geometric transformation processing is a frame of the moving images that are input to the image processing apparatus 100 at a relatively high data rate), the CPU 101 performs the control in which the rotation angle of the geometric transformation is restricted so as not to exceed the predetermined angle. Consequently, the CPU 101 causes the first selection unit 152 and the second selection unit 155 to select the first temporary storage unit 153. Conversely, in a case where the moving images are shot in a moving image recording mode at 4K60P, which is a relatively low data rate (in a case where a target image for the geometric transformation processing is a frame of the moving images that are input to the image processing apparatus 100 at a relatively low data rate), the CPU 101 does not perform the control in which the rotation angle of the geometric transformation is restricted so as not to exceed the predetermined angle. Consequently, the CPU 101 permits the first selection unit 152 and the second selection unit 155 to select the second temporary storage unit 154.

Note that in a case where it is necessary to consecutively process a plurality of input images, such as the case of shooting of moving images, the first selection unit 152 and the second selection unit 155 may make a selection based on the above-described selection criterion for each input image. For example, in a case where the moving images are shot in the moving image recording mode at 4K60P (a case where the rotation angle is not restricted), the first selection unit 152 and the second selection unit 155 may select the first temporary storage unit 153 or the second temporary storage unit 154 based on whether the rotation angle exceeds the predetermined angle for each input image. Alternatively, the first selection unit 152 and the second selection unit 155 may make a selection while treating an entirety of one session of shooting of moving images as one selection unit. In this case, as the rotation angle has a possibility of exceeding the predetermined angle, the first selection unit 152 and the second selection unit 155 select the second temporary storage unit 154 for every input image.

Details of Processing Executed by Geometric Transformation Unit 156

The geometric transformation unit 156 makes a request to the first temporary storage unit 153 or the second temporary storage unit 154 for readout of a region required to generate division units, which are obtained by dividing an output image from the geometric transformation unit 156 into predetermined small regions. The geometric transformation unit 156 collectively issues a predetermined number of requests for a predetermined number of division units without waiting for reception of partial images corresponding to the requests that have already been issued. Based on the plurality of readout requests that have been issued collectively, the first temporary storage unit 153 or the second temporary storage unit 154 determines image ranges to be temporarily held, and receives and stores the image ranges to be held out of the processing results from the signal processing unit 151.

In the present embodiment, necessary region information is passed from the geometric transformation unit 156 located in a posterior part of a data flow to the first temporary storage unit 153 or the second temporary storage unit 154 located in an anterior part thereof. Then, partial images that have been extracted based on this necessary region information are transmitted from the first temporary storage unit 153 or the second temporary storage unit 154 to the geometric transformation unit 156, thereby realizing necessary geometric transformation processing.

Figure 2:
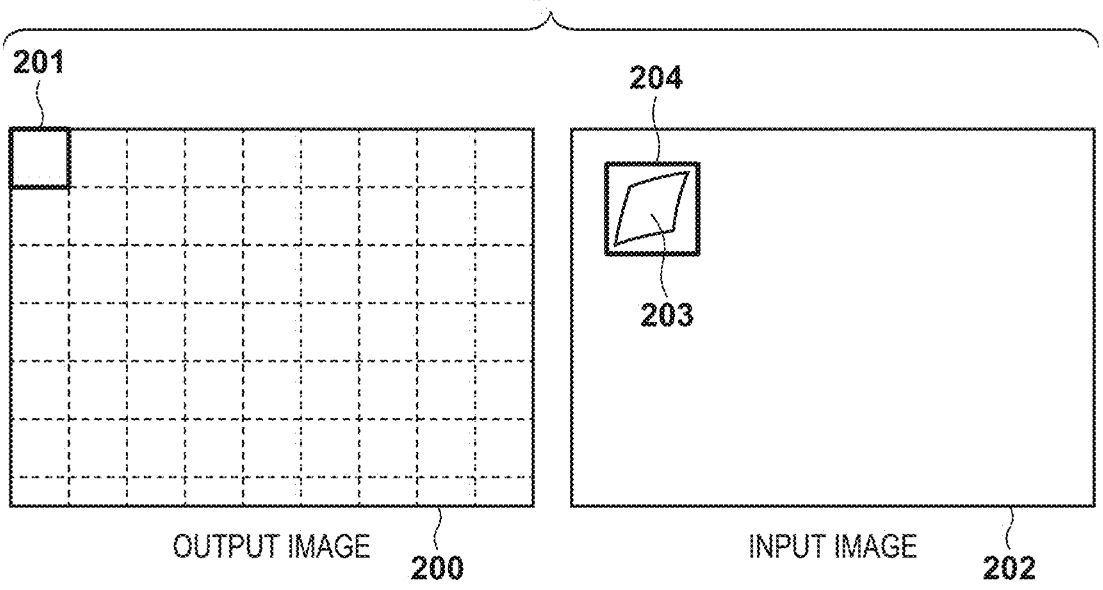
FIG. 2 is a diagram illustrating the contents of processing of a geometric transformation unit 156.

The contents of the processing of the geometric transformation unit 156 will now be described with reference to FIG. 2. An output image 200 is an output image from the geometric transformation unit 156. The geometric transformation unit 156 divides this output image 200 into grids, and processes each of the divided regions in sequence on a per-line basis.

At a timing to obtain an input position of a divided region 201 in the output image, the geometric transformation unit 156 converts output coordinates into input coordinates using a coordinate conversion circuit or coordinate conversion software. As a result of the conversion, a necessary input region 203 is obtained. That is to say, in order to generate an image of the divided region 201 in the output image, it is necessary to read in the necessary input region 203. The shape of the necessary input region 203 is a complex shape depending on the contents of the coordinate conversion; thus, the geometric transformation unit 156 selects an input rectangular region 204 that includes the input region 203. The geometric transformation unit 156 requests the first temporary storage unit 153 or the second temporary storage unit 154 for this input rectangular region 204.

Regardless of whether a partial image corresponding to the input rectangular region 204 designated by the request has been returned from the first temporary storage unit 153 or the second temporary storage unit 154, the geometric transformation unit 156 proceeds with calculation of the input rectangular region corresponding to the next divided region in sequence, and issues a predetermined number of requests to the first temporary storage unit 153 or the second temporary storage unit 154. The coordinate conversion circuit or the coordinate conversion software supports various kinds of geometric transformation processing. It is sufficient to determine what kind of geometric transformation is supported depending on image processing to be executed. In general, there are distortion correction, rolling shutter distortion removal, electronic anti-vibration processing, equirectangular projection conversion, perspective projection conversion, rotation correction conforming to the direction of a display panel, pixel aspect ratio conversion, electronic zooming, and so forth as image processing.

Details of Processing Executed by Second Temporary Storage Unit 154

As described above, the second temporary storage unit 154 includes a memory with a capacity that can hold an entirety of a processing target image. This memory is the DRAM 102 for example, but is not limited thereto.

The second temporary storage unit 154 reads out an image corresponding to the input rectangular region 204 requested by the geometric transformation unit 156 from the DRAM 102 via a memory controller (not shown) or the like. The second temporary storage unit 154 returns the readout result to the geometric transformation unit 156. The readout result is temporarily stored into the SRAM in the geometric transformation circuit 146 that realizes the functions of the geometric transformation unit 156. In a case where the first selection unit 152 and the second selection unit 155 have selected the second temporary storage unit 154, the geometric transformation processing can be realized by moving data from the DRAM 102 to the SRAM in the geometric transformation circuit 146 using a method similar to a method described in Japanese Patent No. 4781229.

Details of Processing Executed by First Temporary Storage Unit 153

Figure 3:
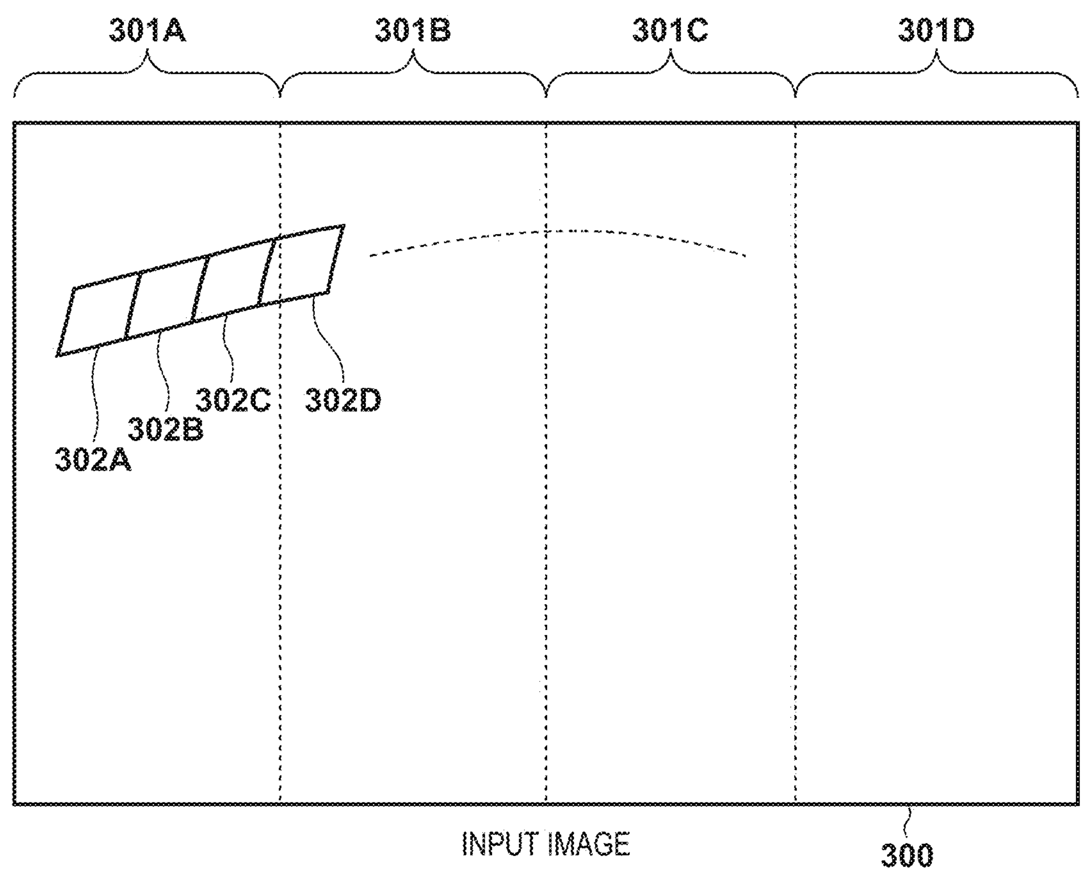
FIG. 3 is a conceptual diagram of an image input to a first temporary storage unit 153.
Figure 4:
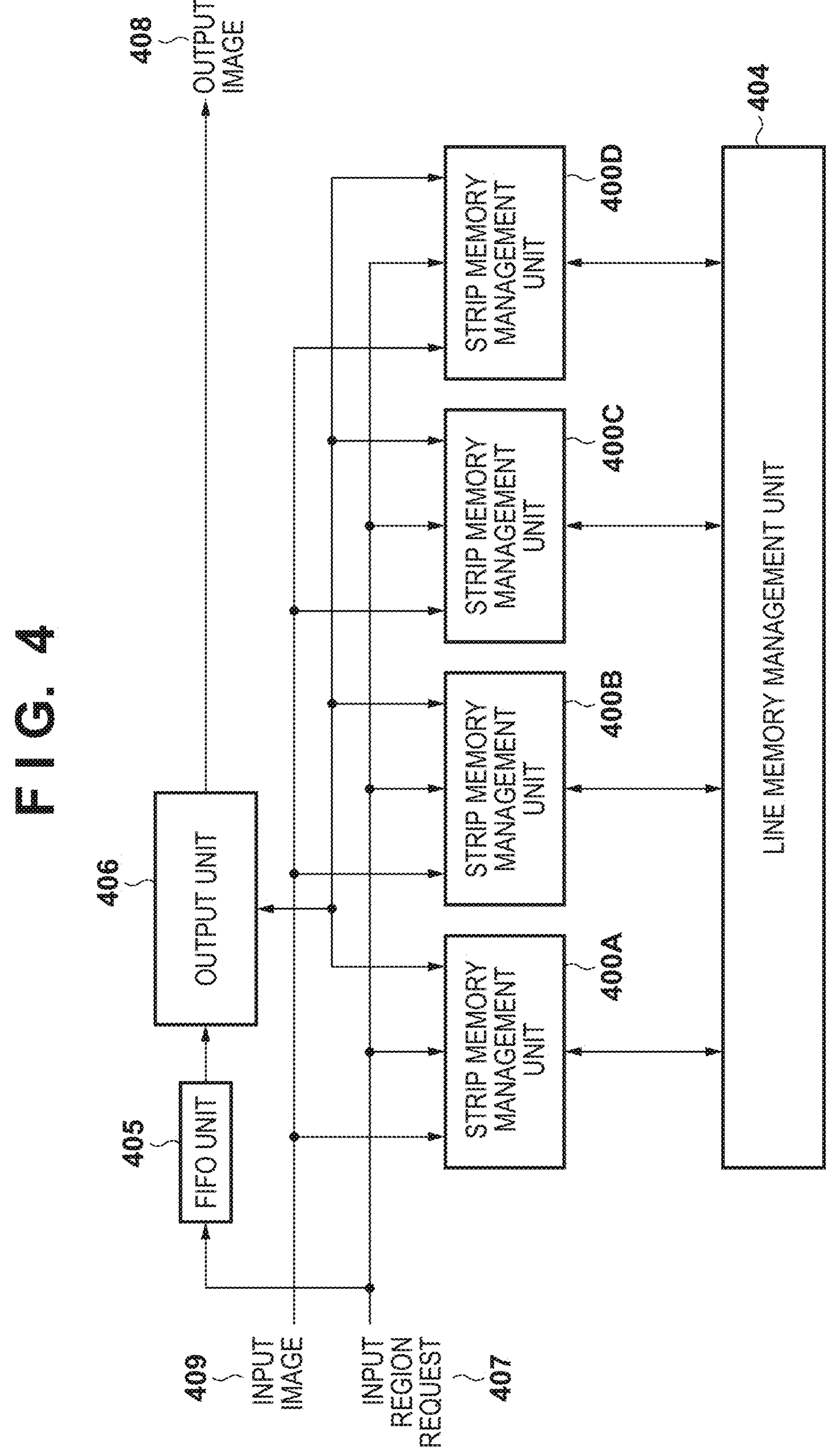
FIG. 4 is a diagram showing an exemplary configuration of the first temporary storage unit 153.

The details of processing executed by the first temporary storage unit 153 will now be described with reference to FIG. 3 and FIG. 4. FIG. 3 is a conceptual diagram of an input image, and FIG. 4 is a diagram showing an exemplary configuration of the first temporary storage unit 153. As described above, the functions of the first temporary storage unit 153 are realized by the SRAM control circuit 143 and the SRAM 144 that operate under control of the CPU 101; in FIG. 4, the illustration corresponding to the SRAM 144 is omitted.

The first temporary storage unit 153 divides an input image, which is a processing result from the signal processing unit 151, into a plurality of strip regions 301 (strip regions 301A to 301D in the example of FIG. 3), and stores them in the SRAM 144. In the present specification, in a case where there is no need to strictly distinguish the strip regions 301A to 301D from one another, they are collectively described as strip regions 301. All of the strip regions 301 need not have the same width. The SRAM 144 includes a plurality of storage elements with a capacity that can store one line of the strip region 301 with the largest width. Hereinafter, such a storage element corresponding to one line will be referred to as a line memory.

As shown in FIG. 4, for each strip region 301, a corresponding strip memory management unit 400 exists. In the example of FIG. 4, the strip memory management unit 400A, the strip memory management unit 400B, the strip memory management unit 400C, and the strip memory management unit 400D correspond to the strip region 301A, the strip region 301B, the strip region 301C, and the strip region 301D, respectively. In the present specification, in a case where there is no need to strictly distinguish the strip memory management units 400A to 400D from one another, they are collectively described as strip memory management units 400.

First, each strip memory management unit 400 initializes a vertical range to be held next to "none". A request for the input rectangular region 204 from the geometric transformation unit 156 is input via an input region request 407. The request for the input rectangular region 204 is distributed to every strip memory management unit 400. Furthermore, the request for the input rectangular region 204 is also stored into a FIFO unit 405 separately from the strip memory management units 400.

Each strip memory management unit 400 recognizes that it should be responsible for the input rectangular region 204 in a case where a rectangular region indicated by the request for the input rectangular region 204 overlaps the strip region 301 corresponding thereto. Each strip memory management unit 400 expands the vertical range to be held next so as to include a vertical range from the top edge to the bottom edge of the rectangular region indicated by the request for the input rectangular region 204. For example, in a case where a request indicating a top edge of 100 and a bottom edge of 110 has been input, the range to be held is changed to 100 to 110. Next, in a case where a request indicating a top edge of 105 and a bottom edge of 115 has been input, the range to be held is expanded to 100 to 115. Each strip memory management unit 400 establishes the vertical range to be held next by repeating the foregoing processing for expanding the range to be held a predetermined number of times. This predetermined number is the number of rectangular regions arranged in a line so as to cover at least one rectangular region in the vertical direction and from the left edge through to the right edge of the output image in the horizontal direction.

After each strip memory management unit 400 has established the vertical range, each strip memory management unit 400 causes the bottom edge of the vertical range to be held next to match the lowest position of the strip memory management unit 400A to the strip memory management unit 400D. For example, assume a case where the vertical range to be held next by the strip memory management unit 400A is 100 to 110, the vertical range to be held next by the strip memory management unit 400B is 90 to 100, the vertical range to be held next by the strip memory management unit 400C is 95 to 105, and the vertical range to be held next by the strip memory management unit 400D is 102 to 112. In this case, as the bottom edge of 112 of the strip memory management unit 400D is at the lowest position, every strip memory management unit 400 changes the bottom edge to 112.

In a case where a processing result output from the signal processing unit 151 has reached the bottom edge of the vertical range to be held during output processing of the geometric transformation unit 156, the first temporary storage unit 153 issues a temporary suspension request to the signal processing unit 151. Conversely, in a case where pixel values requested by the geometric transformation unit 156 have not been held in the first temporary storage unit 153 yet, the first temporary storage unit 153 does not output pixel values to the geometric transformation unit 156 until the requested pixel values are input from the signal processing unit 151.

When all of the strip memory management units 400 have matching bottom edges for their vertical ranges to be held, an output unit 406 starts to operate. The output unit 406 receives, from the FIFO unit 405, a request for an input rectangular region 204 that has been input before. The output unit 406 starts to output an output image 408 based on information indicated by this request. The output image 408 represent pixel values that have been obtained as a result of the output unit 406 receiving necessary pixels by making an inquiry to the strip memory management unit 400 corresponding to the request for the input rectangular region 204. The pixel values output from the first temporary storage unit 153 are temporarily stored into the SRAM of the geometric transformation circuit 146 that realizes the functions of the geometric transformation unit 156.

For example, regarding an input rectangular region 302A that is inside the strip region 301A in the input image, the output unit 406 makes a request for pixel values to the strip memory management unit 400A corresponding to the strip region 301A in the input image, and outputs the obtained pixel values. The same goes for an input rectangular region 302B and an input rectangular region 302C. Regarding an input rectangular region 302D, as it extends over the strip region 301A and the strip region 301B in the input image, the output unit 406 makes a request for pixel values to both of the strip memory management unit 400A and the strip memory management unit 400B. In the present specification, in a case where there is no need to strictly distinguish the input rectangular regions 302A to 302D from one another, they are collectively described as input rectangular regions 302. Note that although each input rectangular region 302 illustrated in FIG. 3 nearly have a shape of a parallelogram, it may have a shape with four corners that each have an angle of 90 degrees, similarly to the input rectangular region 204.

In a case where the pixels requested by the output unit 406 have not been stored into the line memory yet, the strip memory management units 400 pause a response to the output unit 406 until the pixels are stored. Also, the strip memory management units 400 keep receiving an image input via an input image 409 until at least the bottom edge of the vertical range to be held is reached. The strip memory management units 400 may accept the input image until a line that is lower than the bottom edge by a predetermined number of lines. In a case where the image input via the input image 409 is inside the strip regions corresponding to the strip memory management units 400 and is also inside the vertical ranges to be held, the strip memory management units 400 store the image input into the line memory. If the line memory corresponding to the line number of the image input via the input image 409 has already been secured, the strip memory management units 400 write the image into this line memory. If the line memory has not been secured yet, the strip memory management units 400 issue a request to a line memory management unit 404, and define and use a secured line memory as a line memory associated with the line number.

During the operations of this output processing, the strip memory management units 400 further obtain the next "vertical range to be held next" in a procedure similar to the above-described procedure. Upon completion of both of the processing in which the output unit 406 outputs pixel values by reading a predetermined number of requests from the FIFO unit 405 and the achievement of a predetermined number of input region requests 407 that have been input, the first temporary storage unit 153 proceeds to the next operation. When the first temporary storage unit 153 proceeds to the next operation, every strip memory management unit 400 updates the "vertical range to be held next" to the newly obtained range. At the time of this update, each strip memory management unit 400 returns a line memory corresponding to an upper line that has become unnecessary to the line memory management unit 404. The line memory that has been returned in this way is reused as the next lower line memory. The first temporary storage unit 153 can keep updating (sequentially update) a range to be held while holding a part of an image, thereby outputting an image of a necessary range to the geometric transformation unit 156.

Summary of First Embodiment

As described above, according to the first embodiment, the signal processing unit 151 executes signal processing with respect to a target image for the geometric transformation processing (a first image). The first temporary storage unit 153 has a storage capacity smaller than the data amount of a processing result from the signal processing unit 151 (a second image). The storage capacity of the first temporary storage unit 153 is composed of, for example, the SRAM 144. The second temporary storage unit 154 has a storage capacity equal to or larger than the data amount of the processing result from the signal processing unit 151 (the second image). The storage capacity of the second temporary storage unit 154 is composed of, for example, the DRAM 102. The first selection unit 152 and the second selection unit 155 select the first temporary storage unit 153 or the second temporary storage unit 154 as a temporary storage unit that temporarily stores the processing result from the signal processing unit 151 (the second image). The signal processing unit 151 outputs the processing result (the second image) on a per-line basis to the selected temporary storage in sequence. The geometric transformation unit 156 generates an output image (a third image) on a per-line basis in sequence by executing the geometric transformation processing based on the processing result that has been stored into the selected temporary storage unit (the second image).

In a case where the rotation angle of the geometric transformation processing does not exceed the predetermined angle that is based on the storage capacity of the first temporary storage unit 153 and on the data amount of the processing result from the signal processing unit 151 (the second image), the first selection unit 152 and the second selection unit 155 select the first temporary storage unit 153. In a case where the rotation angle of the geometric transformation processing exceeds the predetermined angle, the first selection unit 152 and the second selection unit 155 select the second temporary storage unit 154 as the temporary storage unit.

In a case where the first selection unit 152 and the second selection unit 155 have selected the first temporary storage unit 153, the first temporary storage unit 153 stores the processing result output from the signal processing unit 151 (the second image) on a per-line basis in sequence, and sequentially discards parts of the processing result (the second image) that are finished being used in accordance with the progress of the geometric transformation processing, so that its storage capacity does not overflow.

Therefore, the first embodiment makes it possible to selectively use a memory with a storage capacity smaller than the data amount of a target image for the geometric transformation processing (e.g., the SRAM 144), and a memory with a storage capacity equal to or larger than the data amount of the target image (e.g., the DRAM 102), as needed as a memory that temporarily stores the target image.

Second Embodiment

A second embodiment will be described in relation to a configuration for realizing faster processing than the first embodiment. In the present embodiment, the basic configuration of the image processing apparatus 100 is similar to that of the first embodiment. The following mainly describes the differences from the first embodiment.

Functional Configuration of Image Processing Apparatus 100

Figure 5:
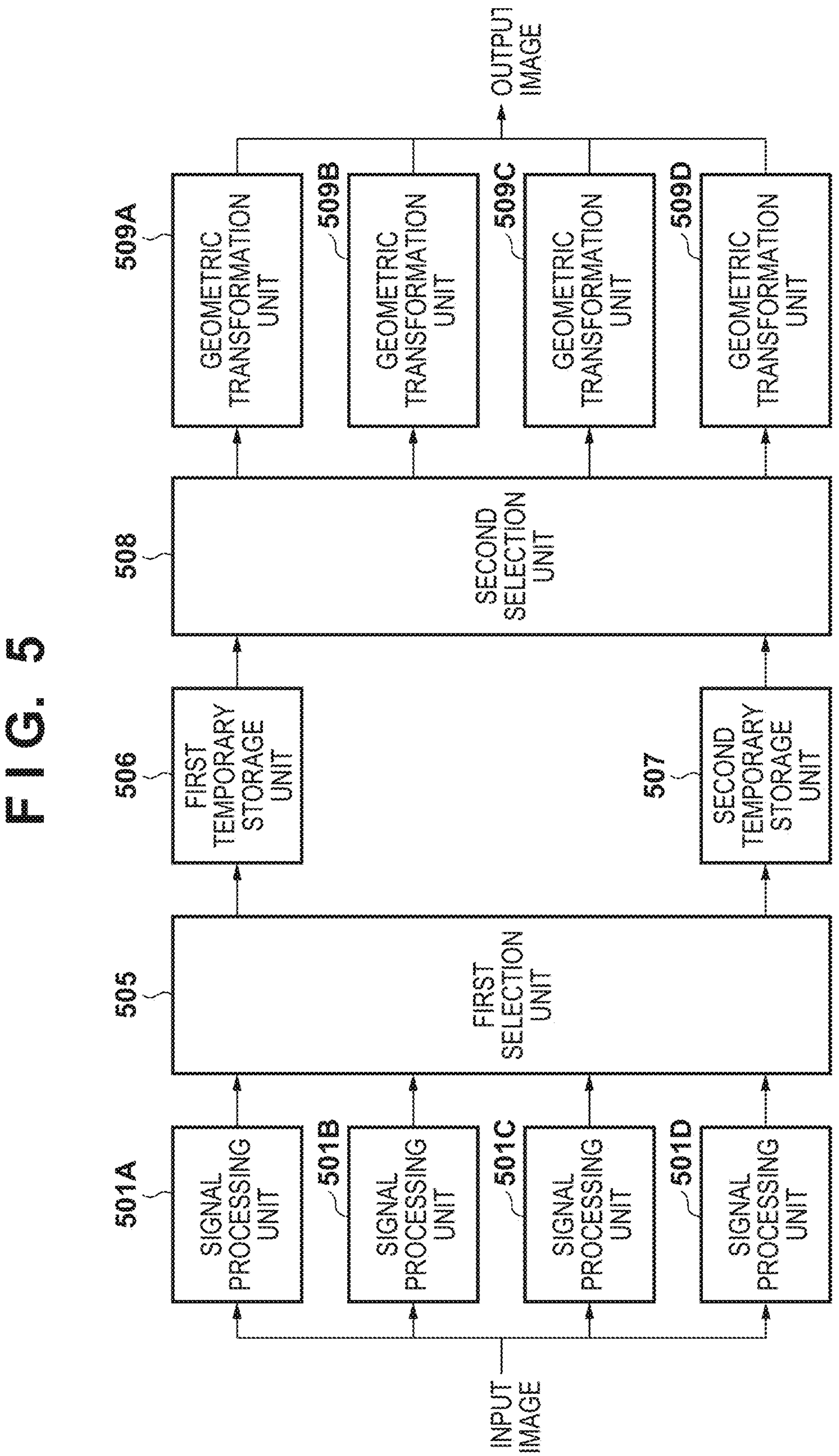
FIG. 5 is a block diagram showing a functional configuration of the image processing apparatus 100 according to a second embodiment.

FIG. 5 is a block diagram showing a functional configuration of the image processing apparatus 100 according to the second embodiment. In the second embodiment, there are a plurality of signal processing units 501 (signal processing units 501A to 501D in the example of FIG. 5), and a plurality of geometric transformation units 509 (geometric transformation units 509A to 509D in the example of FIG. 5). In the present specification, in a case where there is no need to strictly distinguish the signal processing units 501A to 501D from one another, they are collectively described as signal processing units 501. Furthermore, in a case where there is no need to strictly distinguish the geometric transformation units 509A to 509D from one another, they are collectively described as geometric transformation units 509. The number of the signal processing units 501 and the number of the geometric transformation units 509 need not necessarily match. It is sufficient to determine the number of the signal processing units 501 and the number of the geometric transformation units 509 in accordance with a request for the processing performance of a system and the processing performances of the signal processing units 501 and the geometric transformation units 509.

Each signal processing unit 501 is configured similarly to the signal processing unit 151. Note that in the second embodiment, an input image is divided by the number of the signal processing units 501, and each divided input image is input to the corresponding signal processing unit 501.

A first selection unit 505 and a second selection unit 508 are configured similarly to the first selection unit 152 and the second selection unit 155.

Based on read requests from the geometric transformation units 509A to 509D, a first temporary storage unit 506 holds parts of the processing results from the signal processing units 501A to 501D for a predetermined period, and outputs them to the geometric transformation units 509A to 509D. A detailed configuration of the first temporary storage unit 506 will be described later with reference to FIG. 6.

A second temporary storage unit 507 is similar to the second temporary storage unit 154.

Each geometric transformation unit 509 is configured similarly to the geometric transformation unit 156. Note that in the second embodiment, an output image is divided by the number of the geometric transformation units 509, and each geometric transformation unit 509 executes geometric transformation processing with respect to the corresponding divided output image.

Details of Processing Executed by First Temporary Storage Unit 506

Figure 6:
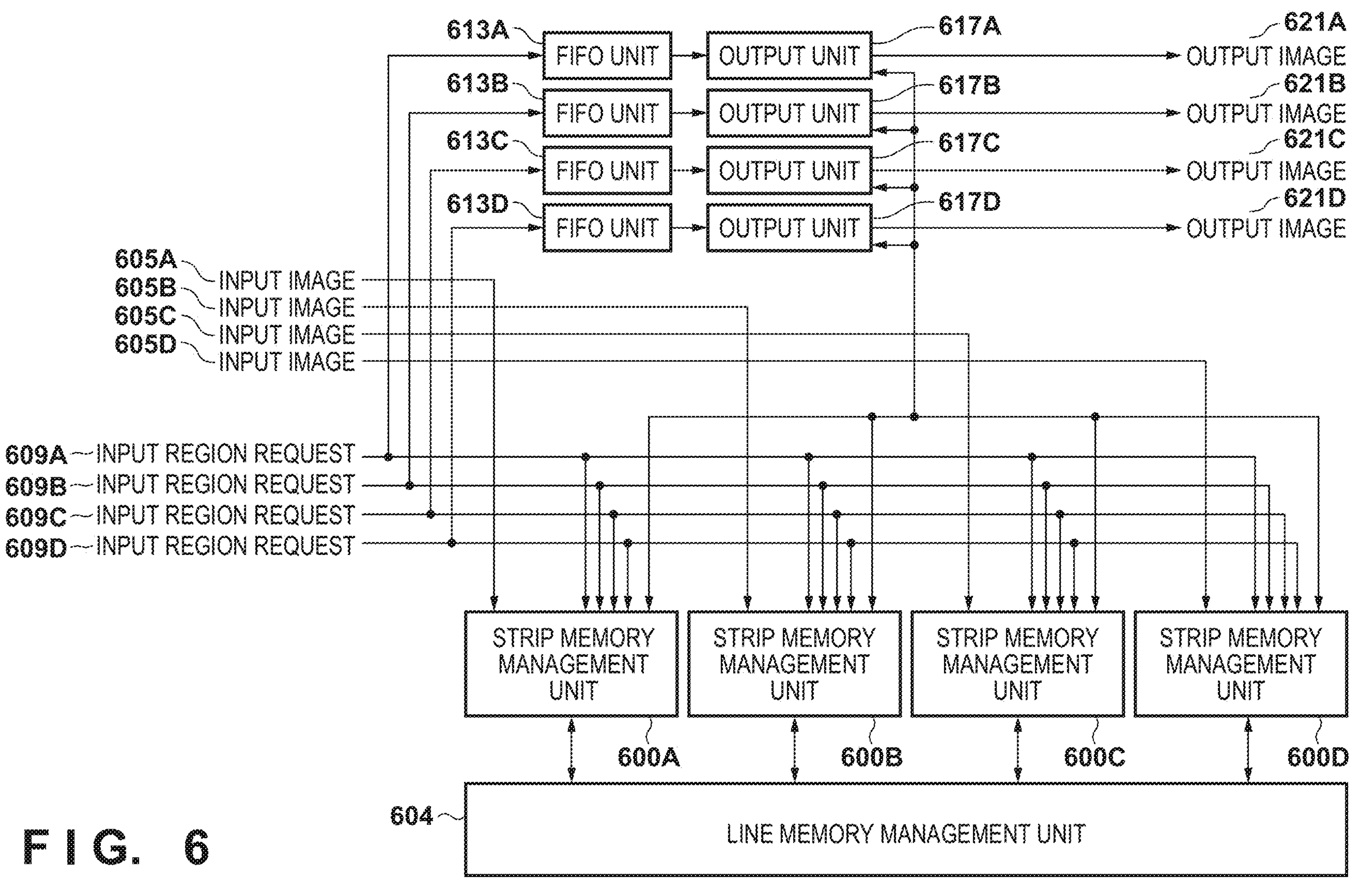
FIG. 6 is a diagram showing an exemplary configuration of a first temporary storage unit 506.

FIG. 6 is a diagram showing an exemplary configuration of the first temporary storage unit 506. An input region request from the geometric transformation unit 509A is input via an input region request 609A. An input region request from the geometric transformation unit 509B is input via an input region request 609B. An input region request from the geometric transformation unit 509C is input via an input region request 609C. An input region request from the geometric transformation unit 509D is input via an input region request 609D. The input region requests 609A to 609D are connected to all of strip memory management units 600A to 600D. Also, the input region requests 609A to 609D are connected to all of FIFO units 613A to 613D.

An output from the signal processing unit 501A is input via an input image 605A. An output from the signal processing unit 501B is input via an input image 605B. An output from the signal processing unit 501C is input via an input image 605C. An output from the signal processing unit 501D is input via an input image 605D. Each input image 605 is connected to the corresponding strip memory management unit 600. In the present specification, in a case where there is no need to strictly distinguish the input images 605A to 605D from one another, they are collectively described as input images 605. Furthermore, in a case where there is no need to strictly distinguish the strip memory management units 600A to 600D from one another, they are collectively described as strip memory management units 600.

Although four strip memory management units 600 are shown in FIG. 6, the number of the strip memory management units 600 may be any as long as it is equal to or larger than the number of the input images 605. In a case where the number of the strip memory management units 600 is larger than the number of the input images 605, a plurality of strip memory management units 600 handle one input image 605. In this case, the plurality of strip memory management units 600 connected to one input image 605 neighbor each other. Then, each strip memory management unit 600 manages a strip region obtained by further dividing a strip region corresponding to the left edge to the right edge of image data input via the input image 605. Each strip memory management unit 600 determines whether each pixel value in the input image is inside the strip region for which it is responsible, and stores the pixel value into the line memory if the pixel value is inside the strip region for which it is responsible. A method of securing the line memory is similar to that of the first embodiment; each strip memory management unit 600 secures the line memory and stores the pixel value by making an inquiry to a line memory management unit 604.

In a case where a plurality of strip memory management units 600 are connected to one input image 605, the vertical ranges to be held by these strip memory management units 600 need to have the same, matching bottom edges. However, the vertical ranges to be held by the strip memory management units 600 connected to different input images 605 need not necessarily have the same, matching bottom edges. On the other hand, the top edge of the vertical range to be held may vary among the strip memory management units 600 (it is possible that the top edges of the vertical ranges to be held by a plurality of strip memory management units 600 match by chance).

The input image that is input from the signal processing unit 501A is input to the strip memory management unit 600A. Similarly, the input images that are input from the signal processing units 501B, 501C, and 501D are input to the strip memory management units 600B, 600C, and 600D, respectively.

On the other hand, all of the strip memory management units 600A to 600D are notified of the input region requests 609A to 609D from the geometric transformation unit 509A. This is because, for example, the input region request from the geometric transformation unit 509A may enter a region managed by the strip memory management unit 600B, particularly in geometric transformation such as distortion correction and rotation.

The strip memory management units 600A to 600D determine an image to be held in the SRAM 144 based on the input region requests from a plurality of input sources. Due to this operation, correlated operations are achieved rather than simple parallel operations, thereby satisfying the requests from the geometric transformation units 509A to 509D, which are requests for curvilinear readout. As correlated processes are executed for the strip regions, synchronized operations are performed naturally as long as the strip memory management units 600A to 600D hold images in response to necessary input region requests.

Other operations are similar to those of the first embodiment. In the geometric transformation processing, due to the occurrence of read out of an input image based on diagonal or curvilinear coordinates, there is a case where neighboring output units among output units 617A to 617D read out overlapping regions. For example, there is a case where the output unit 617A and the output unit 617B read out overlapping regions. The first temporary storage unit 506 is configured to enable read out in consideration of such overlapping. Output images 621A to 621D are output from the output units 617A to 617D.

Summary of Second Embodiment

As described above, according to the second embodiment, the image processing apparatus 100 includes a plurality of signal processing units 501 and a plurality of geometric transformation units 509. Therefore, the second embodiment can complete the geometric transformation processing faster than the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-106204, filed Jun. 28, 2023, which is hereby incorporated by reference herein in its entirety.

What is claimed is:

1. An image processing apparatus, comprising at least one memory and at least one processor and/or at least one circuit which function as:

a signal processing unit configured to generate a second image by executing signal processing with respect to a first image;

a first temporary storage unit configured to have a first storage capacity that is smaller than a data amount of the second image;

a second temporary storage unit configured to have a second storage capacity that is equal to or larger than the data amount of the second image;

a selection unit configured to select the first temporary storage unit or the second temporary storage unit as a temporary storage unit that temporarily stores the second image, the signal processing unit outputting the second image to the temporary storage unit on a per-line basis in sequence; and a geometric transformation unit configured to generate a third image on a per-line basis in sequence by executing geometric transformation processing that is based on the second image stored in the temporary storage unit, wherein the selection unit selects the first temporary storage unit as the temporary storage unit in a case where a rotation angle of the second image in the geometric transformation processing does not exceed a predetermined angle that is based on the first storage capacity and on the data amount of the second image, and selects the second temporary storage unit as the temporary storage unit in a case where the rotation angle exceeds the predetermined angle, and in a case where the first temporary storage unit has been selected as the temporary storage unit, the first temporary storage unit stores the second image output from the signal processing unit on a per-line basis in sequence, and sequentially discards parts of the second image that are finished being used in accordance with a progress of the geometric transformation processing, so that the first storage capacity does not overflow.

2. The image processing apparatus according to claim 1, wherein in a case where the first temporary storage unit has been selected as the temporary storage unit, the geometric transformation unit sequentially outputs, to the temporary storage unit, requests that designate regions of the second image that respectively correspond to lines in the third image on a per-line basis, and based on the requests that are sequentially output from the geometric transformation unit, the temporary storage unit sequentially updates parts of the second image that are to be stored.

3. The image processing apparatus according to claim 1, wherein the at least one memory and the at least one processor and/or at least one circuit further function as a control unit configured to, in a case where a predetermined condition is satisfied, perform control to restrict the rotation angle so as not to exceed the predetermined angle.

4. The image processing apparatus according to claim 3, wherein in a case where the first image is a frame of a moving image that is input to the image processing apparatus at a first data rate, the control unit performs the control to restrict the rotation angle so as not to exceed the predetermined angle, and in a case where the first image is a frame of a moving image that is input to the image processing apparatus at a second data rate lower than the first data rate, the control unit does not perform the control to restrict the rotation angle so as not to exceed the predetermined angle.

5. The image processing apparatus according to claim 1, wherein the first storage capacity is composed of a dedicated memory, and the second storage capacity is composed of a shared memory.

6. The image processing apparatus according to claim 1, wherein the first storage capacity is composed of a memory that is faster than the second storage capacity.

7. The image processing apparatus according to claim 1, wherein the at least one memory and the at least one processor and/or at least one circuit function as:

a plurality of the signal processing units; and a plurality of the geometric transformation units, wherein each of the plurality of signal processing units generates a different region of the second image by executing the signal processing with respect to a different region of the first image, and sequentially outputs the different region of the second image to the temporary storage unit on a per-line basis, each of the plurality of geometric transformation units sequentially generates a different region of the third image on a per-line basis, and in a case where the first temporary storage unit has been selected as the temporary storage unit, the first temporary storage unit sequentially stores each of a plurality of regions of the second image output from the plurality of signal processing units on a per-line basis, and sequentially discards parts of the second image that are finished being used in accordance with a progress of the geometric transformation processing, so that the first storage capacity does not overflow.

8. An image capturing apparatus, comprising:

the image processing apparatus according to claim 1, and an image sensor configured to generate the first image.

9. An image processing method executed by an image processing apparatus comprising a signal processing unit, a first temporary storage unit, a second temporary storage unit, a selection unit, and a geometric transformation unit, the method comprising:

generating, by the signal processing unit, a second image by executing signal processing with respect to a first image;

selecting, by the selection unit, the first temporary storage unit or the second temporary storage unit as a temporary storage unit that temporarily stores the second image, wherein the first temporary storage unit has a first storage capacity that is smaller than a data amount of the second image, the second temporary storage unit has a second storage capacity that is equal to or larger than the data amount of the second image, and the signal processing unit outputs, in the generating, the second image to the temporary storage unit on a per-line basis in sequence; and generating, by the geometric transformation unit, a third image on a per-line basis in sequence by executing geometric transformation processing that is based on the second image stored in the temporary storage unit, wherein in the selecting:

the first temporary storage unit is selected as the temporary storage unit in a case where a rotation angle of the second image in the geometric transformation processing does not exceed a predetermined angle that is based on the first storage capacity and on the data amount of the second image, and the second temporary storage unit is selected as the temporary storage unit in a case where the rotation angle exceeds the predetermined angle, and wherein the method further comprises, in a case where the first temporary storage unit has been selected as the temporary storage unit, storing, by the first temporary storage unit, the second image output from the signal processing unit on a per-line basis in sequence, and sequentially discard, by the first temporary storage unit, parts of the second image that are finished being used in accordance with a progress of the geometric transformation processing, so that the first storage capacity does not overflow.

10. A non-transitory computer-readable storage medium which stores a program for causing an image processing apparatus, which comprises a signal processing unit, a first temporary storage unit, a second temporary storage unit, a selection unit, and a geometric transformation unit, to execute an image processing method comprising:

generating, by the signal processing unit, a second image by executing signal processing with respect to a first image;

selecting, by the selection unit, the first temporary storage unit or the second temporary storage unit as a temporary storage unit that temporarily stores the second image, wherein the first temporary storage unit has a first storage capacity that is smaller than a data amount of the second image, the second temporary storage unit has a second storage capacity that is equal to or larger than the data amount of the second image, and the signal processing unit outputs, in the generating, the second image to the temporary storage unit on a per-line basis in sequence; and generating, by the geometric transformation unit, a third image on a per-line basis in sequence by executing geometric transformation processing that is based on the second image stored in the temporary storage unit, wherein in the selecting:

the first temporary storage unit is selected as the temporary storage unit in a case where a rotation angle of the second image in the geometric transformation processing does not exceed a predetermined angle that is based on the first storage capacity and on the data amount of the second image, and the second temporary storage unit is selected as the temporary storage unit in a case where the rotation angle exceeds the predetermined angle, and wherein the method further comprises, in a case where the first temporary storage unit has been selected as the temporary storage unit, storing, by the first temporary storage unit, the second image output from the signal processing unit on a per-line basis in sequence, and sequentially discard, by the first temporary storage unit, parts of the second image that are finished being used in accordance with a progress of the geometric transformation processing, so that the first storage capacity does not overflow.

* * * * *